United States Patent

[11] 3,630,446

[72] Inventors Willy Roth
Strengelbach;
Anna Elisabeth Keller, Basel, both of Switzerland
[21] Appl. No. 786,553
[22] Filed Dec. 24, 1968
[45] Patented Dec. 28, 1971
[73] Assignee Ciba-Geigy AG
Basel, Switzerland
[32] Priority Dec. 29, 1967
[33] Switzerland
[31] 18371/67

[54] INSECTICIDE-RELEASING SHAPED BODIES AND PROCESS FOR PRODUCING THEM
8 Claims, No Drawings

[52] U.S. Cl. .................................................. 239/60,
43/131, 239/6, 239/34, 424/19, 424/219
[51] Int. Cl. ............................................... A61k 27/12
[50] Field of Search ............................................. 424/219,
78, 83; 239/6, 60; 43/131

[56] References Cited
UNITED STATES PATENTS

| | | | |
|---|---|---|---|
| 2,956,366 | 10/1960 | Wiesmann................... | 43/131 |
| 3,169,705 | 2/1965 | Geiger.......................... | 239/43 |
| 3,173,223 | 3/1965 | Dunn et al. .................. | 43/131 |
| 3,279,118 | 10/1966 | Allen............................ | 43/129 |
| 3,310,235 | 3/1967 | Zbinden ....................... | 239/6 |
| 3,318,769 | 5/1967 | Folckemer et al. ........... | 424/78 |
| 3,364,105 | 1/1968 | Geiger et al. ................. | 424/358 X |
| 3,470,293 | 9/1969 | Geiger.......................... | 424/84 |

OTHER REFERENCES

Miles et al., J. Agr. Food. Chem. 10:240– 244 (1962), " Stable Formulations for Sustained Release of DDVP."

*Primary Examiner*—Shep K. Rose
*Attorney*—Wenderoth, Lind & Ponack

ABSTRACT: A shaped solid body is described which contains insecticidal organic phosphate adsorbed on a solid adsorbent, the adsorbate being so distributed in a solid hydrocarbon base of porous texture that a major portion of the insecticide can be gradually released in vapor form from the surface of the body into the surrounding atmosphere; a process for the production of such bodies is also described. O,O-dimethyl-0-(2,2-dichlorovinyl) phosphate is preferred as the insecticidal component in such bodies.

INSECTICIDE-RELEASING SHAPED BODIES AND PROCESS FOR PRODUCING THEM

The present invention relates to shaped solid bodies containing insecticidal organic phosphate and serving for combating insects especially in enclosed spaces by means of the gradual release, over a prolonged period of time, of effective amounts of the insecticide in vapor form from the surface of the bodies into the surrounding air filling such spaces. The invention also relates to a process for the production of such solid bodies.

The control of insects, such as flies and mosquitoes in enclosed spaces by means of insecticides presents many problems among which there is the need for maintaining an adequate insecticidally effective concentration of the insecticide in vapor form in the air filling such spaces, which concentration must not be so high as to be harmful to warm-blooded animals even when such air is breathed by them over a prolonged period of time. Many articles consisting of shaped bodies, such as strips, sheets, and the like, containing insecticide which is being released gradually from such bodies in vapor form into the surrounding atmosphere have been described and are available in commerce. However, all of these articles suffer from some or all of the following drawbacks:

Sheets or strips which contain an insecticidal organic phosphate in the form of a solid solution in a thermoplastic resin, e.g., in plasticized polyvinyl chloride, suffer from the drawback that in a climate of high atmospheric moisture, the latter is deposited easily on the surface of the body so that the insecticide may be decomposed, proper release of gaseous insecticide may be impeded, and the article surface may become sticky and, due to the highly poisonous nature of the insecticide, may be dangerous to the health of persons handling such articles. Other known articles of manufacture which also contain organic phosphate insecticides in the form of a solid solution from which the insecticide is released by diffusion through the solid base material, while permitting the evaporation of effective amounts of the insecticide for a satisfactory length of time, show profuse "sweating" and dripping off of insecticide from the surface of the base body. Droplets of the insecticide may damage furniture and other objects and are, of course, poisonous to warm-blooded animals.

The requirement in these known insecticide vapor-releasing bodies that the base material must be capable of forming a solid solution of the insecticide and of releasing the latter by diffusion through the base, severely limits the choice of base materials and excludes from use as such paraffins and the like hydrocarbons which have only very limited, unsatisfactory dissolving power for organic esters of phosphoric acid, while the rate of diffusion of such esters through paraffin and the like base material is also insufficient to provide the necessary concentration of insecticide in the surrounding atmosphere.

It is an object of the present invention to provide novel shaped bodies capable of releasing gradually and continuously an insecticidal organic phosphate from the surface of such bodies in vapor form and at a sufficient rate to provide an insecticidally effective concentration of the organic phosphate in the surrounding atmosphere over a prolonged period of time, which concentration is nevertheless not harmful to warm-blooded animals, and which bodies are free from the above-described drawbacks. This object and others which will become apparent in the following description of our invention, are attained by the invention providing shaped solid bodies which comprise a. from about 10 to 25 percent by weight of an insecticidal organic phosphate falling under the formula

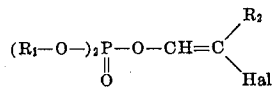

wherein $R_1$ represents alkyl of from one to four carbon atoms, Hal represents middle halogen, and $R_2$ represents hydrogen or middle halogen;

b. a solid base of porous texture consisting essentially of paraffin hydrocarbon having a melting point of at least 50° C. or higher, and being capable of dissolving not more than 1 percent by weight, calculated on the weight of said hydrocarbon, of said organic phosphate (the upper limit of the melting point of the hydrocarbon is dependent on the condition that that of the mixture of the hydrocarbon with any of components (e) to (g), infra, added thereto must be 180° C.);

c. a solid adsorbent, having a particle size, in unagglomerated condition, of at least about 15 millimicrons and being capable of adsorbing, per part of its weight, at least about 0.2 part by weight of said organic phosphate, said solid adsorbent being distributed in said solid base in an amount sufficient to adsorb all of said organic phosphate, the adsorbate consisting of said organic phosphate and said solid adsorbent being so distributed in said base that a major portion of said insecticide can be gradually released in vapor form from the surface of said body into the surrounding atmosphere;

d. dispersing agent in sufficient amount to prevent the sedimentation of the adsorbate consisting of said organic phosphate and said adsorbent in said base when the latter is in molten state;

e. from zero to about 5 percent by weight of stabilizer for said organic phosphate;

f. from zero to about 15 percent by weight of reinforcing agent; and g. from zero to about 10 percent of a thickening agent;

all percentages, except that under (b), being calculated on the total weight of said body; the balance of the total weight of said body minus the sum of the weights of the components (b) through (e) consisting of said solid base.

It is an important feature of the shaped bodies according to the invention that the solid hydrocarbon base in the bodies is of porous texture and that it has a melting point of at least 50° C. Hydrocarbons having a melting point in the range of about 50° to 150° C. and a boiling point above 200° C. are preferred, optimal results being obtained with paraffin (alkane having an average carbon member of at least 24 and up to 70 ) as solid base component.

The pulverulent adsorbent component is preferably a finely divided powder of high adsorbent power such as cellulose powder, silica hydrate such as diatomaceous earth (kieselguhr), fullter's earth, vermiculite, talcum or kaolin, all of which are preferred, while starch powder, pumice powder, and cork powder can also be used. Preferred average particle sizes of the adsorbent are in the range of from 15 millimicrons to 2 millimeters, but can also be larger, for instance of up to 10 mm. diameter.

The preferred organic phosphate shaped bodies according to the invention is 0,0-dimethyl-0-(2,2-dichlorovinyl) phosphate. Another insecticidal organic phosphate falling under formula I, 0,0-dimethyl-0-(2,2-dibromovinyl) phosphate, is also very satisfactory.

Whenever necessary, dispersing agent is added to the mixture of components in sufficient amount to prevent the sedimentation of the adsorbate consisting of the organic phosphate insecticide and the adsorbent therefor in the hydrocarbon base while the latter is in the molten state, as it is during the production of the bodies according to the invention. Such amount is usually in the range of from about 0.5 to 10 percent, calculated on the total weight of the shaped body.

Preferred dispersing agents are reaction products of higher alkylamino-alkylene amine, wherein "alkylene" has from two to preferably not more than four carbon atoms, and higher fatty acid, e.g., stearic acid, coconut oil fatty acid or oleic acid.

The use of reaction products of higher alkyl-propylene amine and oleic acid in a molar ratio of about 1:2 is recommended; "higher" in connection with "fatty acid" or "alkyl" means that such groups have about 10 to 22 carbon atoms.

Other adjuvents which may be incorporated into the solid bodies of this invention, are the above-mentioned reinforcing agents which serve for the improvement of the mechanical properties of the hydrocarbon base employed, particularly the mechanical strength, especially of paraffin; stabilizers for reducing or preventing the decomposition of the insecticide under the influence of light and/or oxygen of the air; dyestuffs for coloring the shaped body according to the invention, as well as scents for covering up any inherent order of the various components.

Of these adjuvents, reinforcing agents are preferably added in amounts of about 1 to 15 percent, stabilizers in amounts of about 0.1 to 5 percent by weight and, if desired at all, dyestuffs, especially organic or inorganic pigments, in amounts of about 0.5 to 5 percent, and scents in amounts of about 0.1 to 5 percent, all percentages being calculated on the total weight of the shaped body.

Preferred reinforcing agents are glass fibers and the like inorganic fibrous products which are nonsolvent for the insecticides of formula I, but organic polymeric substances such as copolymer of vinyl acetate and ethylene which contain about 25 to 30 percent of vinyl acetate component and have an inherent viscosity (30° C. determined in 0.5 percent by weight concentration in toluene) of about 0.75 to 0.85 and a density, at 30° C. of 0.95 g./ml. can also be used. Preferred stabilizers for organic phosphates of formula I are epoxidized vegetable oils, especially cottonseed oil or sunflower seed oil, of low volatility. Thickening agent can be added to facilitate the production of shaped bodies according to the invention. Modified montmorillonite and the like agents are preferred, amounts of about 0.5 to 5 percent of these agents being especially recommended. The use of thickening agents in lieu of reinforcing agents of the copolymer type described above is preferred since such thickeners do practically not dissolve organic phosphates falling under formula I, and do not permit their diffusion therethrough.

The solid bodies according to the invention can be shaped in various forms, for instance as rectangular sheets, as cylindrical rods, as prisms of various cross sections, for instance of cruciform cross section or hexagonal or the like cross section. A preferred shape is that of a cylinder having a central bore. When such hollow cylinders are given a wall thickness of about 1.5 cm., a height of about 10 cm. and a diameter of the circular cylinder cross section of about 4.5 cm., and 0,0 - dimethyl-0-(2,2-dichlorovinyl) phosphate is used as the insecticide, insecticidally effective concentrations of the insecticide are still released to the surrounding atmosphere after 30 to 40 days or even much longer use.

The invention further provides for a process for producing the aforesaid shaped solid bodies containing insecticidal organic phosphate, which process comprises a. heating the above-described hydrocarbon alone or in mixture with a sufficient amount of any of the additives defined under (iv) to (vi), infra, to obtain a melt having a temperature in the range of from about 100° to 180° C., and preferably from about 100° to 150° C.;

b. adding to the melt of said hydrocarbon with stirring and while excluding atmospheric moisture therefrom, i. an organic phosphate of the said formula in such amount as to have from about 10 to 25 percent thereof contained in the total weight of the resulting shaped bodies;

ii. a solid adsorbent, as defined hereinbefore, in sufficient amount to absorb all of said organic phosphate thereon;

iii. stabilizer for said organic phosphate, such amount as to have from zero to about 5 percent thereof contained in the total weight of said shaped solid bodies;

iv. dispersing agent in sufficient amount to prevent sedimentation of the adsorbate consisting of said organic phosphate and said adsorbent in said base when the latter is in molten state;

v. reinforcing agent in such amount as to have from zero to about 15 percent thereof contained in the total weight of said shaped solid bodies;

vi. thickening agent in such amount as to have from zero to about 10 percent thereof contained in the total weight of said shaped solid bodies; and c. pouring the resulting homogeneous mixture at a temperature in the range of from 100° to 180° C. into molds and allowing the mass to cool, thereby obtaining the desired shaped solid bodies which contain the desired hydrocarbon base of porous texture and the adsorbate of organic phosphate and solid adsorbent in the desired state of distribution, whereby gaseous organic phosphate is gradually released from the surface of the shaped bodies into the surrounding atmosphere.

In a first mode of operation, the process for the production of solid bodies according to the invention comprises mixing a liquid organic phosphate insecticide as defined above, with a dry pulverulent adsorbing medium of high adsorptive power and adding the resulting pulverulent adsorbate to the molten hydrocarbon base at a temperature of from about 100° to 180° C., with stirring in a closed vessel, while excluding atmospheric moisture. The resulting composition is then poured into molds and allowed to cool. As a result of the tendency of the organic phosphate to vaporize temporarily during the solidification of the hydrocarbon, pores are formed within the solidifying mass, thus giving the final solid body a peculiar porous texture, similar to that of a rigid sponge or pumice.

The pulverulent adsorbate of adsorbent and organic phosphate can be added to the molten hydrocarbon in a single charge with agitation, in batches or in a continuous process. By previously thoroughly drying the components to be mixed, the stability of the phosphoric insecticide, which is sensitive to moisture, is considerably increased. This is of special importance because of the presence of the phosphoric insecticide in the solid body over a long period of time. When the adsorbate powder consisting of adsorbent and insecticide is poured into the molten base at temperatures above 100° C., optimally, in the case of paraffin, at 120° to 125° C., during the cooling and solidification of the hydrocarbon the temporarily vaporized portion of the organic phosphate forms bubbles and connecting pores in the solidifying body. This is of great importance for obtaining a satisfactory release rate of the gaseous insecticide from the solid body over a prolonged period of time.

The pulverulent adsorbate of organic phosphate on the adsorbent is preferably poured into the molten hydrocarbon in a closed vessel equipped with a stirring apparatus and a refluxing condenser, while avoiding access of atmospheric moisture. The mixture is stirred during the pouring step and still for about 15 minutes longer. The time during which the hydrocarbon can be kept in the molten state before pouring and cooling is not critical and can be as long as 8 hours.

The pouring temperature of the molten mixture into the molds is preferably about 100° to 150° C. The mixture is poured into cold molds made of wood, plastic, glass, stainless steel or the like. Sudden cooling of the molds, e.g., by spraying with cold water, should be avoided; air cooling is sufficient and gives better results. The cooling time of the mass in the molds is about 15 to 30 minutes for every 100 g. thereof. The solidified shaped body according to the invention can be removed from the molds when their temperature has decreased to about 50° C.

whereupon during the contraction and solidification of the material while cooling in the molds, e.g., in the production of hollow spaces in the shaped body is avoided by placing weights on the mold or by other known measures usually taken in the molding of synthetic resins and the like materials.

In another mode of carrying out the process according to the invention in practice, the organic phosphate is mixed with such amount of thickener as to have at most about 10 percent of the latter contained in the total weight of the resulting shaped solid bodies, and with a minor portion of the said hydrocarbon, whereupon the resulting mixture is added to the melt formed of the remaining major portion of said hydrocarbon by step (a); and finally the adsorbent is added to the resulting molten mixture in sufficient amount to adsorb all of the organic phosphate thereon.

The following nonlimitative examples illustrate the invention further. Parts and percentages are given therein by weight unless expressly stated otherwise. DDVP stands for 0,0-dimethyl-0-(2,2-dichlorovinyl) phosphate.

EXAMPLE 1

| | |
|---|---|
| DDVP | 25.0 parts |
| vermiculite (in the form of platelets having an average diameter of about 1 mm) | 15.0 parts |
| paraffin | 60.0 parts |

To produce the adsorbate, DDVP is mixed with the vermiculite to yield practically dry powder.

The paraffin is melted down and the adsorbate is added to the melt at about 100 °C. with stirring during the addition and for a further 15 minutes.

The molten mixture is poured into molds to obtain blocks having the dimensions of 50 ×40 ×10 mm. and a weight of about 24 g.

The blocks were suspended in a room of 30 m.$^3$ having a temperature of 20 ° to 25° C. and a relative humidity of about 65 percent; the vaporization rate of DDVP in mg., per day, was periodically determined by different weighing. In addition, at the beginning and for 108 days after suspension, the insecticidal activity of the atmosphere in the room was determined.

| Rate of vaporization in mg. of DDVP/day | |
|---|---|
| days after suspension | vaporization rate |
| 1 | 100 |
| 10 | 35 |
| 20 | 11 |
| 30 | 12 |
| 40 | 6 |
| 108 | 2.3 |

Biological Test

| | |
|---|---|
| Test method | The block produced in the above example was wrapped in aluminum foil so that only a piece of 2 cm.$^2$ of its surface was left uncovered. The block then exposed in a chamber having a capacity of 40 liters. After 30 minutes, 50 polyvalent-resistant flies (Musca domestic Strain CH) are introduced. Temperature: 23°C. Relative humidity: 60% The test was carried out twice. |

Results

| Test period in minutes | % of flies in dorsal position product produced according to example 1 | |
|---|---|---|
| | beginning | 108 days after suspension |
| 10 | 36 | 18 |
| 15 | 89 | 65 |
| 20 | 100 | 94 |
| 25 | 100 | 100 |

The product produced and tested according to example 1 is excellently suited for the control of flies over a period of about 100 to 110 days.

EXAMPLE 2

| | |
|---|---|
| DDVP | 24.75 parts |
| epoxidized cottonseed oil | 0.25 parts |
| paraffin (m.p. 60/62° | 46.50 parts |
| vinyl acetate/ethylene copolymer (comonomer ratio ethylene: vinyl acetate = 71:29; inherent viscosity at 30° = 0.85 density at 30°= 0.95 g./cm.$^3$ | 12.00 parts |
| orange pigment | 1.50 parts |
| white diatomaceous earth | 15.00 parts |

To produce the adsorbate, DDVP is mixed with diatomaceous earth to yield particularly dry powder.

The paraffin is melted, the melt is heated to about 160° C., the vinyl acetate/ethylene copolymer is dissolved therein and finally the pigment is added.

The adsorbate is then poured into the melt which has been kept at about 160° C. with stirring which is continued for 15 minutes after all of the adsorbate has been added.

The molten mixture is poured into molds to obtain rods having a length of about 105 mm. and a diameter of about 14 mm., corresponding to a surface of about 49.3 cm.$^2$ a volume of about 16.2 cm.$^3$ and a weight of about 16.2 g.

Four such rods were then suspended from a cord to hang parallel and adjacent to each other in a room of 30 m.$^3$ in which room a temperature of 20° to 25° C. and a relatively humidity of about 65 percent/m.$^3$ prevailed. The vaporization rate of DDVP in mg. per day was periodically determined by differential weighing and the insecticidal activity of the rod was determined directly after its production and then again after 130 days' suspension.

| Vaporization rate in mg. of DDVP/day | |
|---|---|
| days after suspension | Vaporization rate |
| 1 | 100 |
| 4 | 563 |
| 8 | 450 |
| 14 | 650 |
| 20 | 150 |
| 30 | 76 |
| 40 | 21 |
| 50 | 49 |
| 60 | 38 |
| 70 | 30 |
| 80 | 18 |
| 90 | 20 |
| 130 | 14 |

Total amount of DDVP which had vaporized after 130 days: 9,300 mg., expressed in percent of the original amount of DDVP: 57.4 percent.

Biological Test

| | |
|---|---|
| Test Method | In a repetition of example 2 supra, two blocks of 50×40×10 mm. are produced, then each is wrapped in aluminum foil, so that only 10 cm.$^2$ of its surface remains uncovered, one of these blocks when freshly produced and the other after suspension for 130 days, are exposed each in a chamber having a capacity of 40 liters; after 30 min. 50 polyvalent-resistant flies (Musca domestica Strain CH) are placed in each chamber having a temperature of 23°C., | the relative humidity therein about 60 percent. The test was carried out in duplicate.

Results

| Test period | % of flies in dorsal position Test sample | |
|---|---|---|
| | freshly produced | having been suspended for 130 days |
| 5 minutes | 0 | 0 |
| 10 | 19 | 0 |
| 15 | 87 | 0 |
| 20 | 95 | 0 197 |
| 25 | 99 | 0 |
| 30 | 100 | 0 |
| 40 | 100 | 0 |
| 40 | 100 | 1 |
| 50 | 100 | 6 |
| 60 | 100 | 16 |
| 90 | 100 | 36 |
| 120 | 100 | 45 |
| 3 hours | 100 | 76 |
| 4 | 100 | 85 |
| 5 | 100 | 93 |
| 6 | 100 | 100 |

These tests show that the product of example 2 is very satisfactory in the control of flies even over a period of more than 130 days.

EXAMPLE 3

| DDVP | 24.75 parts |
|---|---|
| epoxidized sunflower seed oil | 0.25 parts |
| paraffin (m.p. 60/62° C.) | 44.40 parts |
| vinyl acetate/ethylene copolymer (same as used in example 2) | 15.00 parts |
| yellow pigment | 0.60 parts |
| White diatomaceous earth | 15.00 parts |

DDVP and epoxidized sunflower seed oil are mixed in a closed mixer with the diatomaceous earth which has been previously dried in vacuum at 100° C. to obtain an almost dry powder.

In a closed vessel equipped with stirrer, the paraffin is melted, the melt is heated to 100° C., the vinyl acetate/ethylene copolymer is dissolved therein and finally the pigment is added.

The DDVP is adsorbate is then added with stirring to the melt and the entire mixture is kept at 120°to 125° C. for about 30 minutes further with continued stirring.

The melt is then poured at 120°to 125° C. into stainless steel molds which are allowed to cool in the air.

As soon as the temperature of the mass in the molds has decreased to about 50° C., a hollow cylinder produced according to the above procedure (weight: ca. 100 g., height of cylinder: ca. 10 cm., outer diameter: ca. 4.5 cm., diameter of the central bore: ca. 2 cm., thickness of jacket: ca. 1.25 cm., total surface: ca. 200 cm.$^2$) is then removed from the mold.

The hollow cylinder thus produced is placed in a package which is impervious to moisture and DDVP, and kept there until it is to be used.

For combating insects, the follow cylinder is removed from the package and suspended in a room of about 30 m.$^3$ in the upper third of the room.

After being suspended for 42 days, the efficiency of the hollow cylinder is still such that within 1 hour all of the flies which have been released in this room are in dorsal position.

EXAMPLE 4

| DDVP | 14.75 parts |
|---|---|
| epoxidized cottonseed oil (epoxy oxygen content about 6.3%) | 0.25 parts |
| dispersing agent consisting of the reaction product of a mixture of 10% of hexadecylaminopropyleneamine 5% of octadecylaminopropyleneamine 85% of octadecenylaminopropyleneamine and oleic acid in a molar ratio of 1:2 | 5.00 parts |
| yellow pigment | 0.60 parts |
| white diatomaceous earth | 15.00 parts |
| paraffin (m.p. 60/62° C.) | 54.40 parts |

Hollow cylindrical bodies according to the invention are produced from the above components by following the procedure of example 3, except that the dispersing agent given above is used in lieu of the reinforcing copolymer of example 3, and that the temperature during the addition of the adsorbate and during the pouring into molds is held at about 80° C. in lieu of 120°to 125° C.

The efficiency of these cylindrical bodies in combating flies in a room of about 30 m.$^3$ is similar to that of the bodies obtained by example 3.

EXAMPLE 5

| DDVP | 24.75 parts |
|---|---|
| epoxidized cottonseed oil (epoxy oxygen content about 6.3%) | 0.25 parts |
| paraffin (m.p. 60/62° C.) | 58.40 parts |
| yellow pigment | 0.60 parts |
| dimethyl-di-higher alkyl-ammonium montmorillonite (higher alkyl standing for a mixture of hexadecyl and octadecyl in a weight ratio of 70:30) | 1.00 parts |
| white diatomaceous earth | 15.00 parts |

Hollow cylindrical bodies according to the invention are produced from the above components by following the procedure of example 3, except that the montmorillonite derivative as given above is used in lieu of the reinforcing copolymer of example 3, and that the temperature during the addition of the adsorbate and during the pouring into molds is held at about 90° C. in lieu of 120°to 125° C.

The efficiency of these cylindrical bodies in combating flies in a room of about 30 m.$^3$ is similar to that of the bodies obtained by example 3.

EXAMPLE 6

Hollow cylindrical bodies according to the invention are produced from the same components as listed in example 5, but following the procedure given below:

All of the montmorillonite derivative, all of the DDVP and all of the stabilizer are added with stirring to 10.00 parts of the paraffin, while heating the latter to 70° C.

Thereupon, the resulting thickened melt is added to the remainder of the paraffin which has been molten, with stirring, while maintaining the temperature of the mixture at 80° C. After a homogeneous mixture has been obtained, all of the diatomaceous earth and of the pigment are added, stirring is again continued to obtain a completely homogeneous mixture, and the latter is then poured into molds at a temperature of about 80° C.

The efficiency of these cylindrical bodies in combating flies in a room of about 30 m.$^3$ is similar to that of the bodies obtained by example 3.

We claim:

1. A shaped solid organic phosphate insecticide vapor-releasing molded molten and solidified paraffin body having a porous texture with pores capable of releasing gradually and continuously and insecticidal organic phosphate from the surface of such porous textured body in vapor form and at a sufficient rate to provide an insecticidally effective concentration of the organic phosphate in a surrounding atmosphere over a prolonged period of time, said solid molded paraffin body having pores serving as connecting passages to the surface from within for obtaining a satisfactory release rate of the gaseous insecticide from the porous textured solid body over a prolonged period of time, said pores having been formed by the temporary vaporization of the insecticidal organic phosphate within the solidifying cooling mass of molten paraffin, said solid porous textured paraffin body being free from the drawback of profuse sweating and dropping off of droplets of insecticide from the surface of the paraffin shaped body and consisting essentially of a. from about 10 to about 25 percent by weight of an insecticidal organic phosphate tending to vaporize temporarily during the solidification of the cooling mass of the molten paraffin selected from 0,0-dimethyl-0-(2,2-dichlorovinyl)phosphate and 0,0-dimethyl-0-(2,2-dibromovinyl)phosphate;

the major amount of said body consisting of:

b. paraffin hydrocarbon having said porous texture and having a melting point of at least 50° C. and at most such temperature that the melting point of the mixture of said hydrocarbon and any of components (e) to (g) infra does not exceed 180° C.;

c. a solid pulverulent adsorbent, having a particle size, in unagglomerated condition of at least about 15 millimicrons up to about 10 mm. and being capable of adsorbing, per part of its weight, at least about 0.2 part by weight of said organic phosphate, said solid adsorbent being distributed in said solid base in an amount sufficient to adsorb all of said organic phosphate and said solid adsorbent being so distributed in said base that a major portion of said organic phosphate is gradually released in vapor form from the surface of said body into the surrounding atmosphere; and d. dispersing agent in a sufficient amount to prevent sedimentation of the adsorbate consisting of said organic phosphate and said adsorbent in said base when the latter is in molten state;

said body also containing e. from zero to about 5 percent by weight of a stabilizer stabilizing the insecticide against decomposition from oxygen and/or light;

f. from zero to about 15 percent by weight of reinforcing agent for improving the mechanical strength of the paraffin; and g. from zero to about 10 percent of a thickener;

all percentages being calculated on the total weight of said body; the balance of the total weight of said body minus the sum of the weight of components (a) and (c) through (g) consisting of said solid base.

2. A shaped solid organic phosphate insecticide vapor-releasing body as described in claim 1, wherein the body comprises a molded suspendable block of paraffin having a melting point of 60°–62° C. and said organic phosphate is 0,0-dimethyl-0-(2,2-dichlorovinyl)phosphate.

3. A shaped solid organic phosphate insecticide vapor-releasing body as described in claim 2, wherein the amount of said stabilizer ranges from about 0.1 to 5 percent by weight, calculated on the total weight of said body.

4. A shaped solid organic phosphate insecticide vapor-releasing body as described in claim 3, wherein said thickener is dimethyl-di-higher alkyl-ammonium montmorillonite and is present in an amount of about 0.5 to 10 percent calculated on the weight of said body.

5. A shaped solid organic phosphate insecticide vapor-releasing body as described in claim 1, wherein said adsorbent is a silica hydrate.

6. A shaped solid organic phosphate insecticide vapor-releasing body as described in claim 1, wherein said adsorbent is diatomaceous earth.

7. A shaped solid organic phosphate insecticide vapor-releasing body as described in claim 1, wherein said stabilizer is an epoxidized vegetable oil.

8. A shaped solid organic phosphate insecticide vapor-releasing body as described in claim 1, wherein the body comprises a hollow cylinder.

* * * * *